March 9, 1937.  I. W. LITCHFIELD  2,073,408
ONE-WAY BRAKE OR CLUTCH
Original Filed July 29, 1930
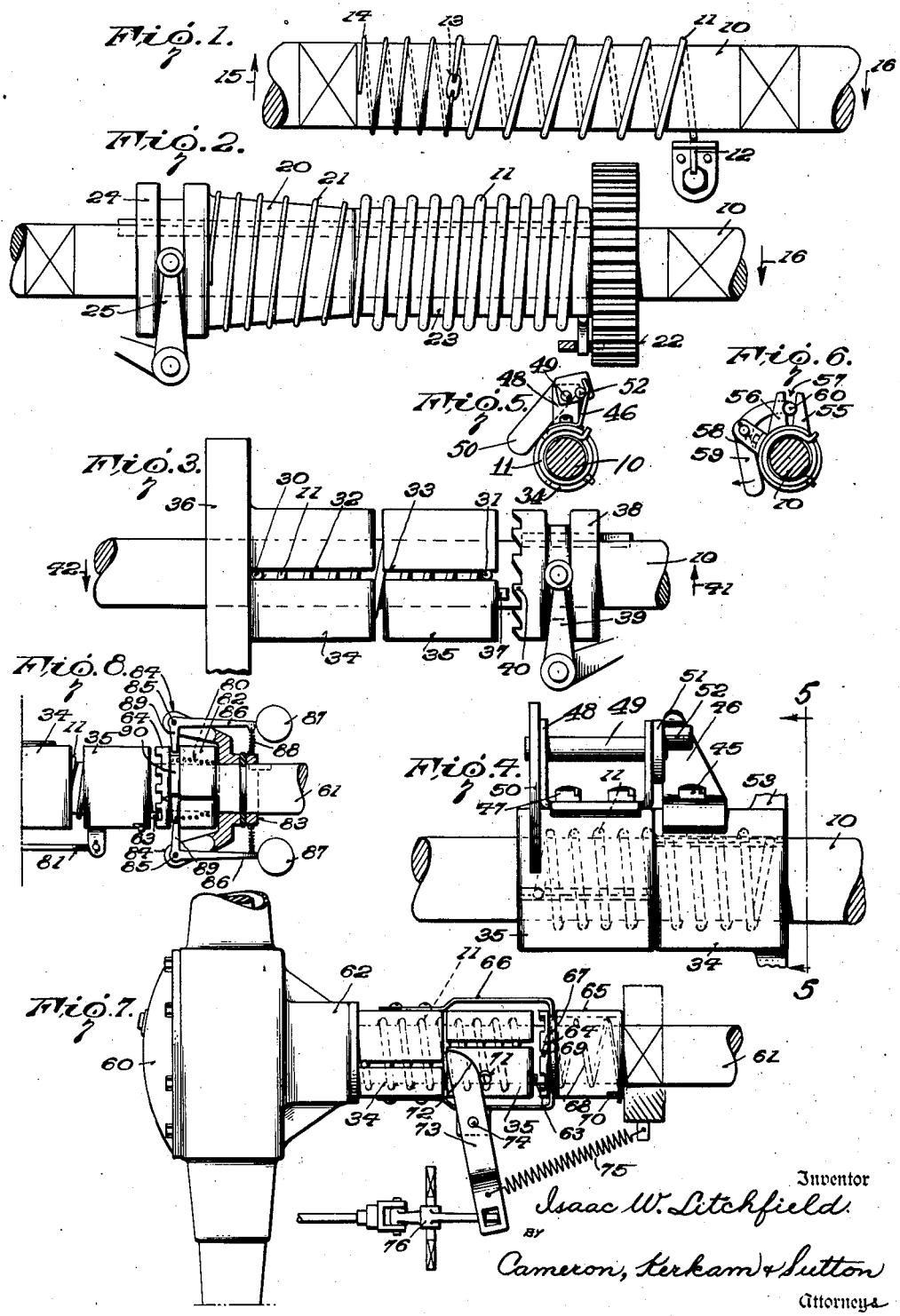
Inventor
Isaac W. Litchfield
By
Cameron, Kerkam & Sutton
Attorneys Patented Mar. 9, 1937

2,073,408

UNITED STATES PATENT OFFICE 2,073,408

ONE-WAY BRAKE OR CLUTCH

Isaac W. Litchfield, Boston, Mass., assignor to William C. Starkey, Indianapolis, Ind., and Raymond S. Pruitt and Walter H. Beal, Chicago, Ill., trustees Application July 29, 1930, Serial No. 471,476
Renewed July 25, 1936

26 Claims. (Cl. 188—30)

This invention relates to clutches, whether used for locking a rotatable member to a relatively stationary member or used for connecting a driving member to a driven member, and also for a particular application this invention relates to a clutch for locking an automobile axle under certain conditions against rotation in the direction of backward movement, as to prevent an automobile unintentionally backing down an incline.

It has heretofore been proposed to provide wrapdown clutches including a helical member which, by relative torsional movement between the ends of the member, is caused to wrap down upon and frictionally grip a shaft, drum or analogous element so as to constitute a unidirectional frictional driving connection between an element attached to the rotatable element and an element attached to the helical member. The helical member may be of either two types—it may have an internal diameter somewhat greater than the external diameter of the drum, in which case the frictional grip of the helical member on the drum must be effected by relative movement of the ends of the helical member in such direction as to tend to wrap the same upon the rotatable element, or the helical member may have an internal diameter which tends to be slightly less than the external diameter of the rotatable element, in which case the helical member normally grips said element and declutching action is effected by relative movement between the ends of the helical member in a direction to cause the same to unwrap with respect to the drum.

Whether a clutch of this type is used to connect driving and driven members or to lock a rotatable member with respect to a relatively stationary member, there should be a minimum friction, with consequent heating and loss of power, between the helical member and the rotatable element when the clutch is not active. For example, in the case of a clutch which acts as a unidirectional connection between driving and driven members, a helical member having an internal diameter such that it tends to grip the driving member may be wrapped around the same and have one end attached to the driven member. The driving member can rotate in that direction which tends to unwrap the helical member, but it will be gripped and locked against rotation relatively to the driven member when rotating in that direction in which the driving member tends to wrap down the helical member onto the driving member, this latter action being initiated by the frictional action of the shaft on the end of the helical member and being applied progressively along the helical member until the frictional grip balances the force tending to retard rotation of the driven member. But with such a construction the rotation of the driving member in the direction in which it is to rotate independently of the driven member is accompanied by a loss of power by reason of the friction between the driving and helical member, because there must be sufficient friction between these members to maintain the helical member in a sufficiently unwrapped condition to permit the driving member to rotate with respect thereto, and as the helical member must be sufficiently strong to lock the driving and driven members together under the forces involved, the friction required to keep the helical member sufficiently unwrapped may be of considerable magnitude. The same considerations also apply in the case of a clutch to prevent reverse rotation of a shaft.

It is an object of this invention to provide an improved clutch of the type above referred to whether for connecting driving and driven members or locking a rotatable element to a stationary element, wherein the friction loss during one direction of rotation of the rotatable element is reduced to a minimum without interfering with the effectiveness of the frictional clutching or locking action when the rotatable element rotates or tends to rotate in the opposite direction.

Another object of this invention is to provide a device of the type just characterized wherein the helical member which performs the locking or clutching action is normally out of contact with the rotatable element and which employs a second helical member to initiate the wrap-down action to effect the locking or clutching action, said latter member being of such character as to offer only a relatively small frictional opposition to rotation of the rotatable element in one direction.

Another object of this invention is to provide an improved clutch which employs a main helical member and an actuating helical member for initiating the action of the main helical member and wherein only a few of the convolutions of the first named helical member are in normal contact with the rotatable element.

Another object of this invention is to provide a device which employs the principles above characterized in locking an automobile axle against rotation when desired.

Another object of this invention is to provide an improved clutch which employs separate helical members for initiating and effecting the clutching or locking action.

Another object of this invention is to provide a clutch employing separate helical members for initiating and effecting the clutching action and a readily disconnectible connection between said members.

Another object of this invention is to provide a clutch employing separate helical members for initiating and effecting the clutching action which is applicable to locking an automobile axle against rotation under certain conditions.

Another object of this invention is to provide a clutch employing separate helical members for initiating and effecting the clutching action wherein the helical member which initiates the clutching action normally rotates with the rotatable element so as to reduce loss of energy by friction.

Another object of this invention is to provide an improved clutch wherein the helical member is connected at its opposite ends to members which can be rotated relatively in an angular direction to wrap down the helical member and initiate the clutching action or unwrap the helical element and effect a declutching action, so that the clutch can be adjusted to engage or disengage the helical member with or from the rotatable element.

Another object of this invention is to provide a device of the type just characterized with improved means for relatively rotating the members to which the ends of the helical member are attached.

Another object of this invention is to provide a device of the type just characterized with self-contained means for effecting the relative rotation of said members.

Another object of this invention is to provide an improved device of the type above characterized with means movable relatively to the members to which the ends of the helical member are attached and which may be brought into action to initiate the action of the helical member, whether to wrap or unwrap the same and whether to connect driving and driven members or to lock a rotatable element with respect to a stationary element.

Another object of this invention is to provide a device of the type just characterized wherein the movable means employs a helical member to initiate clutching action.

Another object of this invention is to provide a device of the type above characterized with speed responsive means for controlling the same.

Other objects of the invention will appear as the description of the invention proceeds.

The invention is capable of receiving a variety of mechanical expressions some of which are shown on the accompanying drawing, but it is to be expressly understood that the drawing is for purposes of illustration only, and is not to be construed as a definition of the limits of the invention, reference being had to the appended claims for that purpose.

Referring to the drawing, wherein the same reference characters are employed to designate corresponding parts in the several figures and wherein several embodiments of the present invention are illustrated more or less diagrammatically in order to render clear the principles of the invention:—

Fig. 1 is an elevation of an embodiment of the present invention;

Fig. 2 is an elevation of a second embodiment of the present invention to illustrate the employment of conical members and also to show how this invention can employ means for entirely disengaging the helical member from the normally rotatable element.

Fig. 3 is an elevation of another embodiment of the present invention;

Fig. 4 is an elevation of a further embodiment similar to that of Fig. 3 but showing a different means for initiating the action of the helical member;

Fig. 5 is a cross section, on a smaller scale, taken on the line 5—5 of Fig. 4;

Fig. 6 is a cross section similar to Fig. 5 but illustrating another construction for relatively rotating the members to which the ends of the helical member are attached;

Fig. 7 is an elevation of yet another embodiment of the present invention illustrating its application to the prevention of backward movement of an automobile; and Fig. 8 illustrates an embodiment employing a speed responsive device for connecting and disconnecting the helical members for initiating and effecting the clutching action.

In the form shown in Fig. 1, 10 represents any suitable rotatable element, as a drum or shaft. Embracing element 10 is a helical member 11 of any suitable form and material. Depending upon the forces involved and the use to which the device is to be put, said member 11 may be of soft steel or cold rolled steel or tempered steel, although it is preferably possessed of at least some resiliency, and said member may be of material which is of any suitable cross section. The size and strength of the material formed into the helix and the number of convolutions employed will depend on the magnitude of the forces involved in the application to which the device is put. Said member may be formed as a relatively open coil, i. e. the pitch of the helix may be relatively large as compared with the axial dimension of the member which is formed into the helix, so that the spaces between successive convolutions of the helix are large as compared with the width of the member which is formed into the helix, or to save space the helix may be relatively closer provided the pitch is not too great, the use of a prehensile actuator permitting the use of a closer helix than is proper when the main helical member must be wrapped and unwrapped by its own cooperation with the rotatable element. Helical member 11 has an internal diameter which is slightly greater than the external diameter of the rotatable element 10 so that it is normally out of contact therewith. The clearance between the two members 10 and 11 can be varied, depending upon the extent of back lash permissible—the smaller the permissible back lash, the smaller must be the clearance. One end of said helical member 11 is fixedly attached in any suitable way to a relatively stationary member as diagrammatically illustrated at 12.

Connected in any suitable way to the opposite end of the helical member 11, as by the coupling diagrammatically illustrated at 13, is a second helical member 14 which may also be formed of any suitable material and have any suitable cross section, but which is preferably a relatively open coil, and which is constructed so as to offer little resistance to wrapping and unwrapping action, being sufficiently flexible to offer little frictional opposition to the rotation of element 10 when rotating in a direction which tends to open said helical member. Member 14 has a cross section which is small as compared with that of member 11, and it is of such internal diameter that it frictionally engages the element 10 at all times, at least at its relatively free end. Instead of member 14 being formed as a separate helical member it may be an integral extension of the member 11 with its cross section decreased in any suitable way, for instance, as shown in Fig. 2.

If the element 10 is rotating in the direction of the arrow 15 at the left of Fig. 1, the frictional action of said element on the helical member 14 tends to unwrap said member with respect to the element 10, and therefore the latter may rotate freely in the direction of the arrow 15 with only the slight frictional opposition which is represented by the force necessary to retain the relatively light helical member 14 in its relatively unwrapped condition. If, on the other hand, the element 10 starts to rotate in the direction of the arrow 16 at the right of Fig. 1, the frictional action of said element 10 on the helical member 14 tends to wrap said latter member down onto said element 10, and the latter is thus gripped to said element 10. Helical member 14 therefore at once applies a wrapping action to the member 11, whereby the latter is wrapped onto the element 10, and said element 10 is thereby positively locked against rotation in the direction of the arrow 16 because it is clutched to the relatively stationary member 12. If, on the other hand, the member 12 be taken as typifying a rotatable member the structure just described will operate as a unidirectional clutch between the elements 10 and 12 as driving and driven elements, as hereinafter described in conjunction with the embodiment of Fig. 2.

Experience has demonstrated that the first few convolutions of the member 11 are entirely adequate to lock the element 10 against rotation in the direction of the arrow 16, and said member 11 could be therefore reduced to a relatively few convolutions, depending on the cross sectional size and strength of member 11, the clearance thereof, the forces involved, etc. However, as a matter of safety, it is preferred to provide the member 11 with the larger number of convolutions. It will be understood that the number of convolutions of the member 11 which are brought into effective action depends upon the magnitude of the force tending to rotate the element 10 in the direction of the arrow 16, the wrapping action of the member 11 being progressive from the relatively free or left hand end as viewed in Fig. 1 until the friction grip thereof on the element 10 balances the rotative torque on the element 10, when the device is used as a lock, or balances the retarding force at the driven element when the device is used to connect driving and driven elements. A relatively light force is all that is needed to initiate the wrap-down action, and once initiated the wrap-down action proceeds progressively until the forces are balanced. Hence a relatively light helical member, which may be characterized as a prehensile member, is all that is required for initiating the wrap-down action, while the true locking or clutching action may be effected by a relatively strong helical member which is entirely adequate to resist the greatest magnitude of forces to be encountered, and which is not only out of contact with the relatively rotatable element and therefore offers no friction to one direction of relative rotation, but which is brought into action by the relatively light prehensile member that offers a minimum of frictional opposition to the relative rotation of the rotatable element in that direction.

Moreover, as will be perceived, the principle embodied in the device of Fig. 1 can be carried out with the use of more than two helical members where the magnitude of forces involved requires it; thus a very light helical member may initiate the action of a helical member of greater strength, and the latter may initiate the action of a helical member of still greater strength, and this principle can be amplified until the ultimate clutching or locking action is effected by a helical member of sufficient strength to amply withstand relatively great forces, and yet all of the helical members with the exception of the first or lightest member, i. e. the prehensile member, may be out of contact with the shaft and oppose no frictional opposition to its rotation in the direction of relative rotation.

In place of employing a generally cylindrical prehensile member cooperating with a generally cylindrical rotatable element, as in Fig. 1, the friction loss may be further reduced by providing a conical surface of engagement between said members. This is illustrated in the embodiment of Fig. 2 wherein the conicity of the contacting surfaces has been considerably exaggerated for purposes of illustration. The conicity may exist only on one of the rotatable members, or both the helical member and rotatable member may be of conical form as shown. By preference the conical angle of the rotatable member 20 is slightly greater than the conical angle of the prehensile member 21, so that only the first few convolutions at the larger end of the prehensile member are in frictional contact with the member 20 during relative rotation. Therefore, the friction loss during relative rotation arises only from the contact of a few of the convolutions of the prehensile member 21, instead of all of the convolutions of the prehensile member as in Fig. 1, but when the element 10 tends to rotate in the direction of the arrow 16 the wrap-down action of the prehensile member 21 is progressive along the member 20 until the helical member 11 is brought into action in the manner heretofore described.

The device of Fig. 2 may be employed as a lock or a unidirectional clutch as in the case of the device of Fig. 1, in which event the member 22 to which one end of the member 11 is attached, could be a relatively stationary member, as the flange on a casing or a torque tube, or it could be a unidirectional driven member. However, Fig. 2 illustrates how the principle of this invention may also be employed for disengaging the prehensile member from the driving element. The element 10 may be taken as typical of any conventional driving shaft having loosely mounted thereon a gear or other driven element 22 to which one end of the helical member 11 is secured. Keyed to the element 10 is the drum 23 embraced by the helical member 11 and also including the conical member 20 which may be integral with but is preferably separate from the drum 23. Attached to the conical member 20 is a grooved collar 24 provided with any suitable shifter 25 for sliding collar 24 and conical member 20 axially of the element 10.

By shifting the collar 24 toward the left as viewed in Fig. 2 the conical member 20 is disengaged from the prehensile member 21 and no rotatable torque is transmitted to the helical members 21 and 11, and the driven element 22, although the element 10 is rotating in the direction of the arrow 16. If the collar 24 is moved to the right as viewed in Fig. 2, the conical member 20 is brought into cooperating engagement with the prehensile member 21, which conditions said prehensile member so that it immediately wraps down onto the member 20 and causes the helical member 11 to wrap down onto the drum 23 if the shaft rotates in the direction of arrow 16. Therefore the drum 23, which is keyed to the shaft 10, is clutched to the driven element 22 and the latter is driven. Any other suitable means for engaging and disengaging the prehensile member can be employed, and if desired suitable means may be provided for locking the shiftable member either in or out of its active position.

Another manner of providing a clutch for locking or clutching a shaft or other rotatable element which can be entirely disengaged from the rotatable element, so as to avoid loss by friction when the lock or unidirectional clutch is not needed, is illustrated in the embodiment of Fig. 3. As here shown the shaft or drum 10 is embraced by a helical member 11 the opposite ends 30 and 31 of which are suitably secured, as by being gripped in slots 32 and 33, to relatively rotatable members 34 and 35, shown as in the form of sleeves substantially enclosing said helical member. Member 34 is suitably attached to a relatively stationary element 36, when the device is used as a lock, while member 35 is provided with one or more axially extending projections 37. Any suitable clutch may be provided for connecting the end of the helical member 11 to the shaft 10 when said helical member is to be placed in action. Keyed to and slidably mounted on the shaft 10 is a collar 38 having a suitable shifting device 39 and provided with axially extending projections 40 for interlocking engagement with the projection or projections 37. The helical member 11, as in prior embodiments above described, is of such internal diameter that it is normally out of contact with the drum or shaft 10, and therefore no frictional opposition to rotation of the shaft 10 in either direction is normally present. Assume that the drum or shaft 10 is rotating in the direction of the arrow 41, and that the grooved collar 38 is moved toward the left as viewed in Fig. 3. The projections 37 and 40 will interlock and the sleeve 35 will be rotated slightly with respect to the sleeve 34 sufficiently to wrap the helical element 11 onto the drum or shaft 10 and prevent relative rotation of the latter in the direction of the arrow 41, in the manner heretofore described, but the shaft or drum 10 can rotate in the direction of the arrow 42 against the frictional resistance of member 11, the projections 37 ratcheting over the projections 40. It will be apparent that if element 36 is a driven element, as 22 in Fig. 2, instead of a relatively stationary element, the device of Fig. 3 will operate equally well as a clutch between the drum or shaft 10 and element 36.

Any other suitable means can be employed for relatively rotating sleeves 34 and 35. Thus, the flange of sleeve 34 can be attached to a stationary element, as the differential housing to be described in conjunction with the embodiment of Fig. 7, when the device is applied to an automobile to lock the car against undesired backward movement, and the sleeve 35 can be provided with a suitable projection to which is attached suitable operating means for moving the free end of the helical member, the operating means being suitably connected for example to the means for placing the automobile in low gear or neutral as hereinafter explained. In fact, in its simplest form the sleeves 34 and 35 could be entirely omitted, one end of the helical member being fixed to a stationary element, and the free end of the helical member being extended radially or otherwise suitably attached to appropriate operating means, such as above referred to. Also when a prehensile member is employed the prehensile means may be normally out of contact with the rotatable element and suitable means may be employed for initiating its contact with said rotatable element, such as those above referred to or those to be described hereinafter in greater detail.

In the embodiment of the invention illustrated in Fig. 4, the helical member 11 again has its opposite ends secured in the slots of relatively rotatable sleeves 34 and 35 as in the embodiment of Fig. 3. Suitably secured to the sleeve 34 as by one or more screws 45 is a rigid radially extending bracket 46. Suitably secured to the sleeve 35, as by screws 47, is a U-shaped bracket 48 having its arms extending radially. Pivotally mounted in the arms of said U-shaped bracket 48 is a stub shaft 49 having an operating arm 50 and a crank arm 51 which carries a pin 52. The brackets 46 and 48 are in approximate axial alignment, but by rotating the arm 50 the crank pin 52 will engage the bracket 46 and move said bracket out of axial alignment with the bracket 48, thereby rotating the sleeve 34 with respect to the sleeve 35.

If the helical member 11 normally has an internal diameter somewhat greater than the shaft 10 this relative rotation of the sleeves 34 and 35 may be used to cause the helical member to grip the shaft 10. On the other hand if the member 11 has an internal diameter that causes it normally to grip the shaft 10, the relative rotation of the sleeves 34 and 35 may be utilized to open up or unwrap helical member 11 and relieve it of its frictional grip on shaft 10. In either event advantage may be taken of the inherent resiliency of the helical member to cause its ends to move angularly in one direction, whether this is used to cause the helical member to unwrap when the sleeves are released or to cause the helical member to engage the rotatable element when the sleeves are released. As in the embodiment of Fig. 3 the sleeve 34 may be suitably attached to or integral with a part 53 which may be a relatively stationary element comparable with the element 36, or it may be a driven element. In the former case the spring in its wrap-down condition will operate to clutch the shaft 10 to the stationary element and act as a lock, while in the latter case the helical member 11 in its wrapped-down condition will operate as a driving connection between the driving element 10 and driven element 53. In either event and whether the helical member is wrapped or unwrapped by the relative rotation of the sleeves 34 and 35 through operation of the arm 50, no frictional opposition to movement of the shaft 10 will exist in the unwrapped condition of the member 11 while the helical member is conditioned to act as a lock or provide a unidirectional clutch when the sleeves 34 and 35 are so moved that the helical member 11 may assume its wrapped-down condition.

Fig. 6 illustrates an alternative means for causing relative rotation of the sleeves 34 and 35 of Fig. 4. As here shown the contiguous ends of said sleeves are provided with adjacent radially extending lugs or brackets 55 and 56 which provide a V-shaped slot 57 therebetween. Suitably mounted on a bracket 58 is a lever 59 having an axially extending pin or wedge 60 which may move radially in the V-shaped slot 57 and cause relative circumferential movement between the lugs or brackets 55 and 56. Any suitable means may be employed to actuate lever 59 or wedge 60. Such relative movement can be utilized to lock the shaft 10 against rotation or clutch driving and driven elements, as in the embodiment of Fig. 4, and this action may be accomplished with either a helical member of larger diameter than the shaft or with the helical member that normally grips the shaft as described in conjunction with the embodiment of Fig. 4.

Fig. 7 shows an embodiment of this invention employing a prehensile spring that normally rotates with the shaft and which has a disconnectible connection with a helical member having an internal diameter that is normally greater than the shaft, this embodiment being shown as applied to the torque tube of an automobile transmission to prevent rotation of the axle in one direction. The universal housing and axle drive is diagrammatically indicated at 60 and the driving shaft at 61, although the invention could be applied directly to any other suitable shaft, if desired. Attached to the torque tube 62 in any suitable way is the split sleeve 34 of the character heretofore described, said sleeve together with the split sleeve 35, also of the character heretofore described, encasing a helical member 11. Sleeve 35 carries one or more axially extending projections 63 for cooperation with axially extending projections 64 on the sleeve 65 next to be described. Rotatably mounted on the driving shaft 61 is a sleeve 65 that is held against axial movement in any suitable way, as by bracket arms 66 secured to the torque tube or the sleeve 34 and having radially extending projections engaged in a groove 67 in the sleeve 65. Encased within the sleeve 65 is a prehensile spring 68 of the type heretofore described in conjunction with the embodiment of Fig. 1, or if preferred the construction of Fig. 2 may be employed. Said spring 68 is suitably secured at one end to the sleeve 65, as by engagement of its end in a notch in the sleeve as shown at 69, while its opposite end is attached to but movable relatively to the sleeve 65, as by engagement in a slot 70. Prehensile spring 68 normally rotates with the shaft 61 but is held against rotation when sleeve 65 is locked to sleeve 35, in which latter condition spring 68 may move sufficiently relatively to sleeve 65 owing to slot 70, so as to wrap-down onto shaft 61.

Extending radially from the sleeve 35 are a pair of pins 71, and cooperating therewith are the cam-faced ends 72 of a bifurcated lever 73 pivotally mounted at 74 in any suitable way and normally urged in an anticlockwise direction by coil spring 75. Connected to the lever 73 is any suitable device 76 for moving the lever in a clockwise direction around its axis 74 and against the tension of the spring 75 to move sleeve 35 axially and bring projections 63 and 64 into interlocking engagement. Device 76 may be actuated in any suitable way when the gear shift is moved to first or low speed, or to neutral position, as preferred. The invention will be described as employed when the first or low speed gear is brought into operation, to prevent backward movement when an automobile travelling up-hill slows down to low speed or comes to a standstill—although it will be apparent that if preferred the operation to be described can be effected when the gear shift is brought to neutral position.

Assuming that the car is travelling at high speed and is brought to first or low speed, the movement of the gear shift to low speed through connection 76 moves the lever 73 in a clockwise direction around its axis 74, moving the sleeve 35 axially to engage the interlocking projections 63 and 64. Therefore the sleeve 65 with its prehensile spring 68 is locked to the sleeve 35 with its helical member 11. As long as the shaft 61 and sleeve 65 continue to rotate in the direction corresponding with the forward movement of the automobile, the shaft 61 can rotate relatively to the prehensile spring 68, which is now held against rotation by the projections 63 and 64 between the sleeves 35 and 65, but with the small frictional loss characteristic of the use of a prehensile spring as above described. If the shaft 61 tends to rotate in the opposite direction, however, corresponding to that direction in which the automobile would be backing down the grade, the prehensile spring 68 at once wraps down on shaft 61, and this wrap-down action is transmitted from sleeve 65 to sleeve 35, to wrap down the helical member 11 and effectively lock shaft 61 so as to prevent further backward movement of the automobile. The car is thus locked against rearward movement but can move forwardly at first or low speed at any time with only the small frictional loss represented by the engagement of the prehensile spring 68 with the shaft 61, a loss which is of no consequence with the high power ratio represented by the power plant of the car in low gear. As soon as the car moves forward at second or higher gear the connection 76 is thrown out of operation, the spring 75 restores the lever 73 to the relationship of parts shown in Fig. 7, and the sleeve 35 withdraws its projections 63 from the projections 64 by reason of the inherent resiliency of the helical member 11, which being out of contact with the shaft 61 can operate axially as well as circumferentially. The car therefore proceeds without frictional loss due to the presence of the lock heretofore described, since the prehensile spring 68 and sleeve 65 are now free to rotate with the shaft 61. If preferred, however, the drum 65 or a part thereof may be the axially movable member.

The embodiment illustrated in Fig. 8 employs a prehensile spring 80 which is actuated by a speed responsive device, the construction otherwise being similar to that shown in Fig. 7 except that sleeve 35 has a connection 81 that is positively actuated when the gear shift is moved to reverse. As in the prior embodiment the shaft 61 carries rotatably mounted thereon a sleeve 82 which encloses the prehensile spring 80. Sleeve 35 and sleeve 82 are provided with interlocking projections 63 and 64 respectively, but in this embodiment said interlocking projections 63 and 64 are normally engaged as shown. Suitably secured to the shaft 61 is a sleeve 83 provided with a plurality of bracket arms 84 on each of which is pivoted at 85 a lever 86 carrying a weight 87 and normally pulled into the position shown by spring 88. Each of said levers 86 has an arm 89 which engages in a groove 90 in the sleeve 82.

When the shaft 61 is rotated at relatively high or usual driving speeds, the weights 87 move outwardly under the action of centrifugal force, and the sleeve 82 is moved away from sleeve 35, slightly compressing the prehensile spring 80, and disengaging the interlocking projection 63, 64. This will be the condition when the gear shift is in second or high gear. When the shaft 61 slows down to relatively low speed, the reduced centrifugal force permits the weights 87, under the action of the springs 88, to move the levers 86 into the position shown in the drawing, reengaging the interlocking projections 63 and 64, so that the prehensile spring 80 is operatively connected to the helical member 11 within the relatively rotatable sleeves 34 and 35. The shaft 61 can still rotate forwardly, against the slight frictional opposition of the prehensile spring 80, but if the shaft 61 starts to rotate rearwardly, the prehensile spring 80 is at once brought into action, and is wrapped down on the shaft 61, transmitting its torque through the projections 63 and 64 to the sleeve 35, and by relative rotation of the sleeves 35 and 34 the helical member 11 is brought into operation to lock the shaft 61 against rearward movement. If rearward movement is desired, however, and the gear shift is moved to reverse position, the connection 81 positively moves the sleeve 35 away from the sleeve 82, slightly compressing helical member 11, and disconnects the prehensile spring 80 from the helical member 11. In this embodiment both helical members 11 and 80 act as coil springs to normally urge sleeves 82 and 35 to engage their projections 63 and 64.

The embodiment of Fig. 8 also illustrates another form which may be taken by the prehensile member. In this embodiment the prehensile member is of generally cylindrical form, comparable with the embodiment of Fig. 1, but only the first few convolutions thereof are of such internal diameter that they normally grip the shaft, the remaining convolutions being of somewhat greater internal diameter so as to be normally free of the shaft. Hence in this embodiment the cylindrical prehensile member possesses the small frictional opposition to rotation of the shaft in one direction that characterizes the construction of Fig. 2 wherein only the first few convolutions of the prehensile member are engaged with the conical actuating member. Both of these constructions possess the advantage that the prehensile member, being in part out of contact with the rotatable element, may operate as a coil spring either tending to engage or disengage the parts which establish the operative connection between the prehensile member and the main helical member.

In these latter embodiments, as in the embodiment first described, it will be apparent that if the member to which the sleeve 34 is attached is a rotatable member, the device will operate as a clutch between driving and driven members, which will be unidirectional when the prehensile member is operatively connected with the main helical member, but which permits free rotation of the shaft in either direction when the prehensile member is disconnected from the main helical member.

It will, therefore, be perceived that a clutch has been provided which may operate either as a lock to prevent rotation of a shaft or other rotatable element in one direction or a unidirectional clutch between driving and driven elements, and in which the friction loss during relative rotation of the rotatable element and helical member is reduced to a minimum without interfering with the effectiveness of the locking or clutching action when the action of the helical member is desired, because the helical member which performs the clutching or locking action is normally out of contact with the rotatable element and is brought into operation only when clutching or locking action is desired.

When a prehensile member is used frictional opposition to the rotation of the rotatable element in one direction is reduced to a relatively small amount by reason of the character of the prehensile member, or friction may be still further reduced by use of a conical surface of contact, as in the embodiment of Fig. 2, or by providing a prehensile member having different internal diameters, as in the embodiment of Fig. 8, and even this small frictional loss may be eliminated by providing the disconnectible connection heretofore described between the prehensile member and the main helical member, or otherwise providing for the entire disengagement of the prehensile member from the rotatable element as heretofore referred to. But whether a prehensile member is used or not and whether it is normally in engagement with the rotatable element or not, the main helical member provided for effecting the clutching or locking action is out of frictional contact with the rotatable element when it is not in action.

Means have also been provided whereby the helical member may be entirely disengaged from the shaft or other rotatable element or caused to be conditioned for wrapping thereon by relative rotation or angular displacement of the ends of the helical member, whether the helical member be of an internal diameter that is normally greater than or tends to be less than the external diameter of the rotatable element, so that when the helical member is unwrapped with respect to the rotatable element the rotatable element is free to rotate in either direction, but when the helical member is contracted radially for engagement with the rotatable element it is conditioned to act either as a lock or a unidirectional clutch. Moreover, means have been provided for using the principle just stated with self contained or shaft operated means for actuating the helical member as well as in conjunction with a prehensile member for causing relative displacement between the ends of the main helical member, whereby except under certain conditions there is no frictional loss by reason of the presence of the clutch or lock. Means have also been provided whereby this principle can be employed in conjunction with speed responsive devices.

Additionally, an application of the foregoing principles for the prevention of an automobile backing down an incline when in neutral or low gear has been provided, such application affording a positive lock against undesired reverse rotation of the axle while offering no frictional resistance due to the presence of the lock while the car is moving at the usual driving speeds—the lock offering frictional resistance to the forward movement of the axle only when the car is in low gear and the ratio of gears is such as to make the small friction loss immaterial.

When operating as a clutch between driving and driven elements it will be observed that the foregoing devices are reversible as respects driving and driven members.

While a number of different embodiments of the present invention employing prehensile members, helical members with annularly displaceable ends and self-contained or shaft-operated means for effecting such angular displacement, and combinations of the two wherein a prehensile member effects such angular displacement, have been illustrated and described with considerable particularity it is to be expressly understood that the invention is not restricted to the embodiments shown and described, as the invention is capable of receiving a variety of other mechanical expressions, some of which will now readily suggest themselves to those skilled in the art. Various combinations of the features heretofore disclosed may also be employed. For example, any one of the several forms of prehensile members of the present invention may be used in the various embodiments, the arm 50 of Figs. 4 and 5 or the wedge 57 of Fig. 6 could be speed controlled, etc., the prehensile member could be used to initiate the unwrapping of a normally wrapped main helical member, etc. while various other combinations of features disclosed will suggest themselves to those skilled in the art. Changes may also be made as respects details of construction, arrangement and proportion of parts and certain features used without others without departing from the spirit of this invention. Reference is therefore to be had to the claims hereto appended for a definition of said invention. In the claims the term "clutch" will be used as generic, unless otherwise specified, to embrace the clutching of a rotatable element to a stationary element to effect a lock, or the clutching of a rotatable element to a driven element to constitute a unidirectional drive.

What is claimed is:

1. In a device of the character described, the combination of a rotatable element and a clutch associated therewith, said clutch including a helical member embracing and normally out of contact with said rotatable element, and shiftable means including an axially shiftable prehensile member for initiating operation of said helical member.

2. In a device of the character described, the combination of a rotatable element and a clutch associated therewith, said clutch including a helical member embracing and normally out of contact with said rotatable element, an element normally rotating with said rotatable element and out of operative connection with said helical member, and a prehensile member associated with said rotatable element and normally disconnected from but connectible to said helical member.

3. In a device of the character described, the combination of a rotatable element with a clutch associated therewith, said clutch including a helical member embracing said rotatable element, members mounted for relative angular displacement and connected to the opposite ends of said helical member, a prehensile member for effecting relative angular displacement of said members, and means for controlling the operation of said prehensile member.

4. In a device of the character described, the combination of a rotatable element and a clutch associated therewith, said clutch including a helical member embracing said rotatable element, members mounted for relative angular displacement and connected to the opposite ends of said helical member, means normally rotating with said rotatable element, a prehensile helical member associated and rotating therewith, and means for operatively connecting said last named means with one of said members to effect relative angular displacement of said members.

5. In a device of the character described, the combination of a rotatable element and a clutch associated therewith said clutch including a helical member embracing said rotatable element, members mounted for relative angular displacement and connected to the opposite ends of said helical member, means for effecting angular displacement of said last named members including a prehensile helical member, and speed responsive means for controlling the operation of said prehensile member.

6. In a device of the character described, the combination of a rotatable element and a clutch associated therewith, said clutch including a helical member embracing said rotatable element, members mounted for relative angular displacement and connected to the opposite ends of said helical member, a normally rotatable member adapted to be operatively connected with one of said members, and speed responsive means for effecting said operative connection.

7. In a device of the character described, the combination of a rotatable element and a clutch associated therewith, said clutch including a helical member embracing said rotatable element, members mounted for relative angular displacement and connected to the opposite ends of said helical member, a prehensile member and a shiftable connection for connecting said prehensile member with one of said angularly displaceable members.

8. In a device of the character described, the combination of a rotatable element and a clutch associated therewith, said clutch including a helical member embracing said rotatable element, members mounted for relative angular displacement and connected to the opposite ends of said helical member, a member normally rotating with said rotatable element and including a prehensile member engaging said rotatable element, and means for shifting one of said members to connect said prehensile member operatively with said helical member.

9. In a device of the character described, the combination of a rotatable element and a clutch associated therewith, said clutch including a helical member embracing and normally out of contact with said rotatable element, a prehensile member engaging said rotatable element, and a disconnectible connection between said prehensile member and said helical member.

10. In a clutch for preventing relative rotation in one direction between two elements, in combination with a rotatable element and an element to be clutched thereto, a helical member embracing and normally out of contact with said rotatable element, a prehensile helical member normally disconnected from said helical member, and means for connecting said prehensile member to said helical member to condition said prehensile member for initiating the wrapping down of said helical member onto said rotatable element.

11. In a clutch for preventing relative rotation in one direction between two elements, in combination with a rotatable element and an element to be clutched thereto, a helical member embracing and normally out of contact with said rotatable element, and speed responsive means normally disconnected from said helical member but connectible thereto at a predetermined speed for initiating the wrapping down of said helical member onto said rotatable element.

12. In a clutch for preventing relative rotation in one direction between two elements, in combination with a rotatable element and an element to be clutched thereto, a helical member embracing said rotatable element, members mounted for relative angular displacement and connected to the ends of said helical member, prehensile means for angularly displacing said members whereby relative rotation of said first named elements is permitted in one direction but not in the other, and movable means for rendering said prehensile means operative and inoperative.

13. In a clutch for preventing relative rotation in one direction between two elements, in combination with a rotatable element and an element to be clutched thereto, a helical member embracing said rotatable element but normally out of engagement therewith, members mounted for relative angular displacement and connected to the opposite ends of said helical member, and rotatable means adapted to be positively locked with one of said first named members to condition said helical member with respect to said rotatable element for preventing relative rotation thereof in one direction.

14. In a clutch for preventing relative rotation in one direction between two elements, in combination with a rotatable element and an element to be clutched thereto, a helical member embracing said rotatable element, members mounted for relative angular displacement and connected with the opposite ends of said helical member, a rotatable member, and speed responsive means for connecting said last named member with one of said first named members to condition said helical member for wrapping onto said rotatable element in order to prevent relative rotation between said helical member and rotatable element in one direction.

15. In a clutch for preventing relative rotation in one direction between two elements, in combination with a rotatable element and an element to be clutched thereto, a helical member embracing said rotatable element, a prehensile member embracing and normally in contact with said rotatable element, and means for connecting and disconnecting said prehensile member to and from said helical member to operatively condition said helical member to prevent relative rotation between said rotatable element and helical member in one direction.

16. In a clutch for preventing relative rotation in one direction between two elements, in combination with a rotatable element and an element to be clutched thereto, a relatively strong helical member embracing said rotatable element, a relatively light prehensile helical member for initiating the operation of said helical member and normally in contact with said rotatable element, said prehensile member having only a part of its convolutions in contact with said rotatable member, and means for connecting and disconnecting said helical members.

17. In a device for preventing movement of an automobile, in combination with a rotatable shaft, a clutch for locking said shaft to a stationary element and including a helical member embracing and normally out of contact with said shaft, and means responsive to the speed of said shaft for wrapping said helical member onto said shaft.

18. In a device for preventing movement of an automobile, in combination with a rotatable shaft, a clutch for locking said shaft to a stationary element and including a helical member embracing and normally out of contact with said shaft, a stationary member and a member mounted for relative angular displacement to which the ends of said helical member are attached, and means normally rotating with said shaft and disconnected from said last named member but adapted to be positively locked therewith to displace the same angularly and wrap said helical member onto said shaft.

19. In a device for preventing movement of an automobile, in combination with a rotatable shaft, a clutch for locking said shaft to a stationary element and including a helical member embracing and normally out of contact with said shaft, a prehensile member embracing and normally in contact with said shaft, said prehensile member being normally disconnected from said helical member, and means for connecting said prehensile member with said helical member.

20. In a device for preventing movement of an automobile, in combination with a rotatable shaft, a clutch for locking said shaft to a stationary element and including a helical member embracing and normally out of contact with said shaft, a stationary member and a member mounted for relative angular displacement and connected to the opposite ends of said helical member, a member normally rotating with said shaft and including a prehensile member normally in contact with said shaft, and means for connecting said last named member with said angularly displaceable member whereby said prehensile member is conditioned to wrap said helical member onto said shaft.

21. In a device for preventing movement of an automobile, in combination with a rotatable shaft, a clutch for locking said shaft to a stationary element and including a helical member normally embracing and out of contact with said shaft, a prehensile member normally disconnected from said helical member and engaging and normally rotating with said shaft, and means responsive to a change in speed of said shaft for connecting and disconnecting said prehensile member with said helical member.

22. In a device for preventing movement of an automobile, in combination with a rotatable shaft, a clutch for locking said shaft to a stationary element and including a helical member embracing and normally out of contact with said shaft, a prehensile member normally disconnected from said helical member and engaging and normally rotating with said shaft, and means responsive to a predetermined shift of gears for operatively connecting said prehensile member with said helical member.

23. In a device for preventing movement of an automobile, in combination with a rotatable shaft, a clutch for locking said shaft to a stationary element and including a helical member embracing and normally out of contact with said shaft, a stationary member to which one end of said helical member is attached, a prehensile member for wrapping said helical member onto said shaft, and shiftable means for connecting and disconnecting said prehensile and helical members.

24. In a device for preventing movement of an automobile, in combination with a rotatable shaft, a clutch for locking said shaft to a stationary element and including a helical member embracing and normally out of contact with said shaft, a stationary member to which one end of said helical member is attached, means for initiating the wrapping of said helical member onto said shaft, and a shiftable connection between said last named means and helical member.

25. In a device for controlling from a distance the rotation of a rotatable element and in combination with said element, a helical member having a greater inside diameter than said element and normally exerting no frictional opposition to the rotation thereof, means for initiating the wrapping of said helical member onto said element, and a disconnectible positive connection between said initiating means and said helical member.

26. In a device for controlling from a distance the rotation of a rotatable element and in combination with said element, a helical member having a greater inside diameter than said element and normally exerting no frictional opposition to the rotation thereof, means operable from a distance for initiating the wrapping of said helical member onto said element, a disconnectible connection between said initiating means and said helical member, and speed responsive means for controlling the operation of said helical member.

ISAAC W. LITCHFIELD.